(12) United States Patent
Liu

(10) Patent No.: US 11,061,509 B2
(45) Date of Patent: Jul. 13, 2021

(54) ARRAY SUBSTRATE, DRIVING METHOD THEREOF AND DISPLAY PANEL

(71) Applicants: Hefei Xinsheng Optoelectronics Technology Co. Ltd., Hefei (CN); BOE Technology Group Co., Ltd., Beijing (CN)

(72) Inventor: Guodong Liu, Beijing (CN)

(73) Assignees: Hefei Xinsheng Optoelectronics Technology Co. Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/826,198

(22) Filed: Mar. 21, 2020

(65) Prior Publication Data

US 2021/0096724 A1 Apr. 1, 2021

(30) Foreign Application Priority Data

Sep. 29, 2019 (CN) .......................... 201910937245.X

(51) Int. Cl.
*G06F 3/041* (2006.01)

(52) U.S. Cl.
CPC ........ *G06F 3/04184* (2019.05); *G06F 3/0412* (2013.01); *G06F 3/04186* (2019.05)

(58) Field of Classification Search
CPC ............. G06F 3/04184; G06F 3/04186; G06F 3/0412; G06F 3/0443; G06F 3/0446
See application file for complete search history.

(56) References Cited

U.S. PATENT DOCUMENTS

| | | | | |
|---|---|---|---|---|
| 2011/0273398 A1* | 11/2011 | Ho | ......................... | G06F 3/0443 345/174 |
| 2014/0218634 A1* | 8/2014 | Zhou | ..................... | G06F 3/0443 349/12 |
| 2014/0347318 A1* | 11/2014 | Kim | ...................... | G06F 3/0446 345/174 |
| 2015/0317025 A1* | 11/2015 | Pai | ......................... | G06F 3/0443 345/173 |

* cited by examiner

*Primary Examiner* — Michael Pervan
(74) *Attorney, Agent, or Firm* — Arent Fox LLP; Michael Fainberg

(57) ABSTRACT

An array substrate, a driving method thereof, and a display panel. The array substrate includes a plurality of touch electrodes, including driving electrodes and sensing electrodes; a plurality of driving leads electrically connected with the driving electrodes in a one-to-one corresponding manner; a plurality of sensing leads, where the sensing electrodes in a same column are electrically connected with sensing lead terminals in a non-display area through the same sensing lead, the driving leads electrically connected with the driving electrodes in a same row are electrically connected with the same first branch, and the driving leads electrically connected with the driving electrodes in different rows are electrically connected with the different first branches.

18 Claims, 5 Drawing Sheets

ARRAY SUBSTRATE, DRIVING METHOD THEREOF AND DISPLAY PANEL

CROSS-REFERENCE TO RELATED APPLICATION

This application claims priority of Chinese Patent Application No. 201910937245.X, filed on Sep. 29, 2019, which is hereby incorporated by reference in its entirety.

FIELD

The present disclosure relates to the field of display, in particular to an array substrate, a driving method thereof and a display panel.

BACKGROUND

TDDI, namely touch and display driver integration, has a biggest feature that a touch chip and a display chip are integrated in a same chip, and adopts the touch operation based on a self-capacitance principle.

SUMMARY

An embodiment of the present disclosure provides an array substrate, including:
- a plurality of touch electrodes, being located in a display area and arranged in an array, and including driving electrodes, and sensing electrodes arranged in the same layer as the driving electrodes and located on one side of the driving electrodes, and the driving electrodes and the sensing electrodes being insulated from each other;
- a plurality of driving leads, being located in a display area, extending in a first direction and being electrically connected with the driving electrodes in a one-to-one corresponding manner;
- a plurality of sensing leads, being located in the display area and extending in the first direction, and the sensing electrodes in a same column electrically connected with sensing lead terminals in a non-display area through the same sensing lead; and
- a plurality of driving connecting lines, respectively including a first branch extending in a direction perpendicular to the first direction, and a second branch electrically connecting an end part of the first branch with a driving lead terminal in the non-display area, where the driving leads electrically connected with the driving electrodes in a same row are electrically connected with the same first branch, and the driving leads electrically connected with the driving electrodes in different rows are electrically connected with different first branches.

In a possible implementation mode, the sensing electrodes respectively include N sub-sensing electrodes which are insulated from each other, and the sub-sensing electrodes are sequentially arranged in the first direction, where N is a positive integer; and
the sensing leads respectively includes N sub-sensing leads, the sub-sensing electrodes are electrically connected with the sensing lead terminals through the sub-sensing leads.

In a possible implementation mode, in the sub-sensing electrodes in the same column, the sub-sensing electrodes at intervals of N−1 sub-sensing electrodes are electrically connected with one sub-sensing lead.

In a possible implementation mode, the first branch includes a first end part and a second end part; and
the driving connecting lines respectively includes one second branch, and the second branch is electrically connected with first end part of the corresponding first branch.

In a possible implementation mode, the first branch includes a first end part and a second end part; and
the driving connecting lines respectively includes two second branch, where one of the second branches is electrically connected with the first end part of the corresponding first branch, and the other second branch is electrically connected with the second end part of the corresponding first branch.

In a possible implementation mode, in a direction perpendicular to the first direction, a width of a sub-sensing electrode are one-half of a width of a driving electrode.

In a possible implementation mode, in a direction parallel to the first direction, a lengths of the sensing electrode are one-Nth of a length of the driving electrode.

In a possible implementation mode, an area of one driving electrode is equal to the sum of areas of 2N sub-sensing electrodes.

In a possible implementation mode, the array substrate includes a substrate and a gate line located on one side of the substrate, and a data line located on one side, away from the substrate, of the gate line; and
the first branch and the gate line are arranged in a same layer.

In a possible implementation mode, the array substrate includes a substrate and a gate line located on one side of the substrate, and a data line located on one side, away from the substrate, of the gate line; and
the first branch are located on one side, away from the substrate, of the data line.

In a possible implementation mode, the driving leads and the sensing leads are arranged in the same layer as the data line.

In a possible implementation mode, the touch electrodes are reused as common electrodes.

An embodiment of the present disclosure further provides a display panel including the array substrate provided by some embodiments of the present disclosure.

An embodiment of the present disclosure further provides a driving method of the array substrate provided by some embodiments of the present disclosure, including: a touch stage. In the touch stage, the driving method includes the steps of:
- sequentially loading touch driving signals to the driving connecting lines; and
- determining a touch position according to touch sensing signals output by the sensing leads.

In a possible implementation mode, each of the driving connecting lines includes the two second branches; and
the steps of loading touch driving signals to the driving connecting lines includes:
simultaneously loading the touch driving signals to two ends of the same driving connecting line through the two second branches.

DETAILED DESCRIPTION OF THE EMBODIMENTS

In current TDDI products, there are many problems, for example, the number of touch channels is relatively large, the anti-noise capability is weak, the processing speed of touch signals is slower (the defects of the self-capacitance sensing principle itself cause the presence of "ghost points" during multi-point touch, and the chip may firstly recognize the "ghost points" during processing, so that the signal processing speed is relatively slower), and when some rapid touch operations, such as rapid line drawing, are performed, obvious delay occurs.

In order to enable the objects, the technical solutions and the advantages of embodiments of the present disclosure to become clearer, the technical solutions in the embodiments of the present disclosure will be clearly and completely described below in combination with accompanying drawings in the embodiments of the present disclosure. Obviously, the described embodiments are only one part of the embodiments of the present disclosure rather than all of the embodiments. Based on the embodiments described in the present disclosure, all the other embodiments obtained by ordinary those skilled in the art without creative labor are still within the scope of the claimed present disclosure.

Unless otherwise defined, the technical or scientific terms used in the present disclosure should have ordinary meanings understood by ordinary those skilled in the field to which the present disclosure belongs. "First", "second", and similar words used in the present disclosure do not indicate any order, number or importance, but are only used to distinguish different components. "Including" or "comprising" and similar words mean that the element or the item appearing before the word covers the elements or the items and the equivalents thereof listing after the word, without excluding other elements or the items. "Connecting" or "connected" and the similar words are not limited to physical or mechanical connections, but may include electrical connection, no matter whether the connection is direct or indirect. "Up", "down", "left", "right", and the like are only used to indicate the relative position relationship. When the absolute position of a described object changes, the relative position relationship may also change correspondingly.

To keep the following description of the embodiments of the present disclosure clear and concise, the present disclosure omits the detailed descriptions of known functions and known components.

Figure 1:
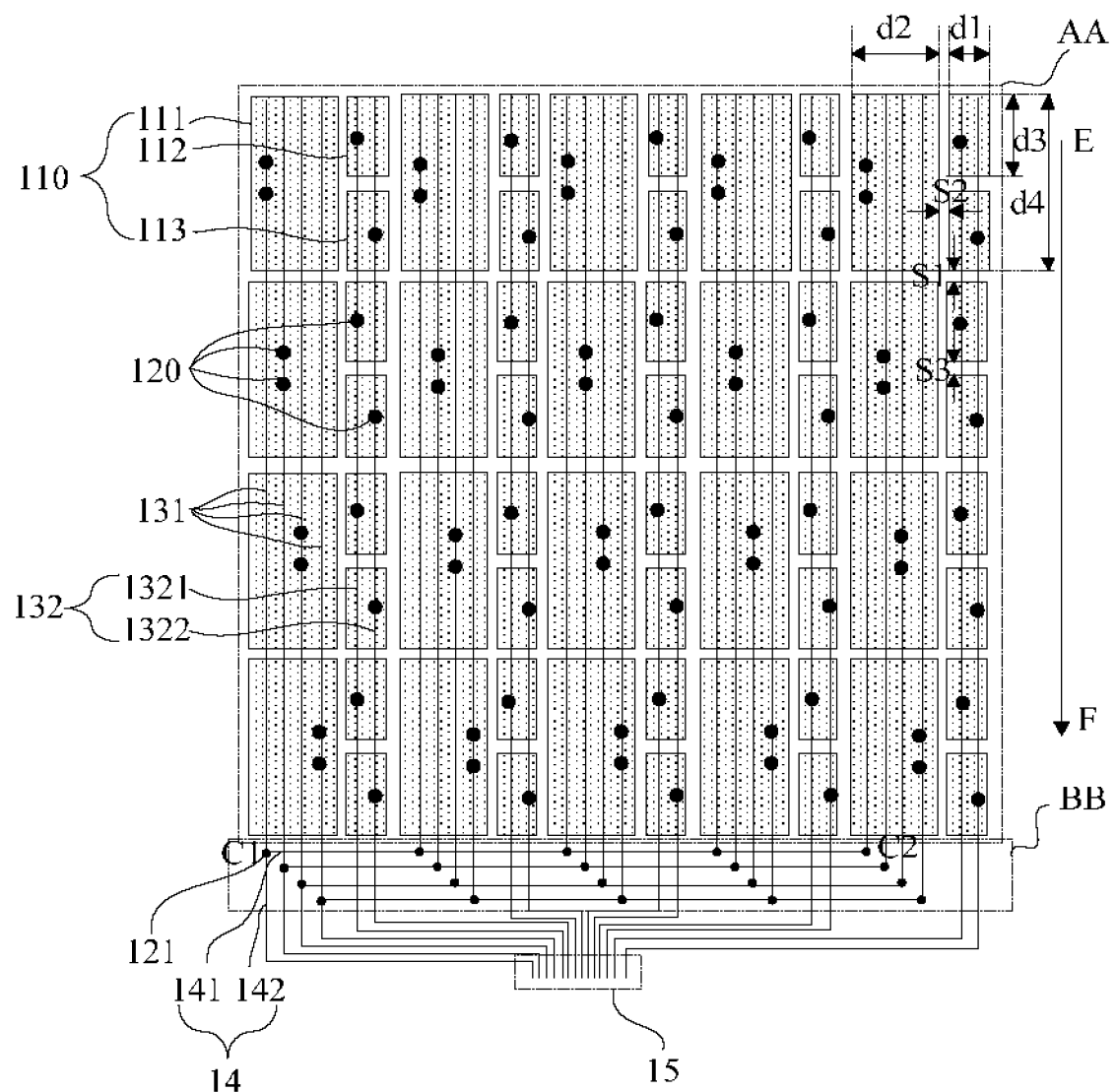
FIG. 1 is a structural schematic diagram of an array substrate in which each sensing electrode has two sub-sensing electrodes provided by an embodiment of the present disclosure.

Referring to FIG. 1, an embodiment of the present disclosure provides an array substrate. The array substrate may include a display area AA and a non-display area BB. The array substrate includes:

a plurality of touch electrodes 110, being located in the display area AA and arranged in an array, and including driving electrodes 111 and sensing electrodes (including a first sub-sensing electrode 112 and a second sub-sensing electrode 113) in a same layer as the driving electrode 111 and located on one sides of the driving electrodes 111, and the driving electrodes 111 and the sensing electrodes being insulated from each other;

a plurality of driving leads 131, being located in the display area AA, extending in a first direction EF and being electrically connected with the driving electrodes 111 in a one-to-one corresponding manner, and optionally, each driving lead 131 electrically connected with one driving electrode 111 through two touch electrode holes 120;

a plurality of sensing leads 132, being located in the display area AA and extending in the first direction EF, and the sensing electrodes in a same column being electrically connected with sensing lead terminals in the non-display area BB through the same sensing lead; and a plurality of driving connecting lines 14, including first branches 141 extending in a direction perpendicular to the first direction EF, and second branches 142 electrically connecting end parts of the first branches 141 with driving lead terminals in the non-display area BB, where the driving leads 131 electrically connected with the driving electrodes 111 in a same row are electrically connected with the same first branch 141, the driving leads 131 electrically connected with the driving electrodes 111 in different rows are electrically connected with the different first branches 141, the driving lead terminals and the sensing lead terminals are arranged in a pin area 15, specifically, the first branches 141 and the driving leads 131 are located in different layers and are conducted correspondingly through connecting line holes 121, the second branches 142 and the driving leads 131 are located in the same layer, and the second branches 142 are fabricated while the driving leads 131 are fabricated.

According to the array substrate provided by the embodiment of the present disclosure, the touch electrodes 110 include the driving electrodes 111 and the sensing electrodes; the driving leads 131 are electrically connected with the driving electrodes 111 in a one-to-one corresponding manner; for the plurality of sensing leads 132, the sensing electrodes in the same column are electrically connected with the sensing lead terminals in the non-display area BB through the same sensing lead 132; and for the plurality of driving connecting lines 14, the driving leads 131 electrically connected with the driving electrodes 111 in the same row are electrically connected with the same first branch 141, and the driving leads 131 electrically connected with the driving electrodes 111 in the different rows are electrically connected with the different first branches 141, namely the driving electrodes 111 in the same row are electrically connected with a control chip through one driving connecting line 14, and further the number of pins can be effectively reduced. Moreover, the driving electrodes 111 in the same row are electrically connected with one driving connecting line 14, further touch driving signals are input to one row of the driving electrodes 111 through one driving connecting line 14, and the touch driving signals are input to the various rows of the driving electrodes 111 row by row and the touch sensing signals are output through the touch sensing electrodes, so that mutual capacitance touch may be realized and the better touch performance may be provided. In the case of the number of pins of the control chip unchanged, the array substrate of the present application may enable the sizes of the touch electrodes to be smaller than the sizes of the touch electrodes using the self-capacitance principle (the traditional solution), thereby effectively improving the touch accuracy and precision.

Figure 2:
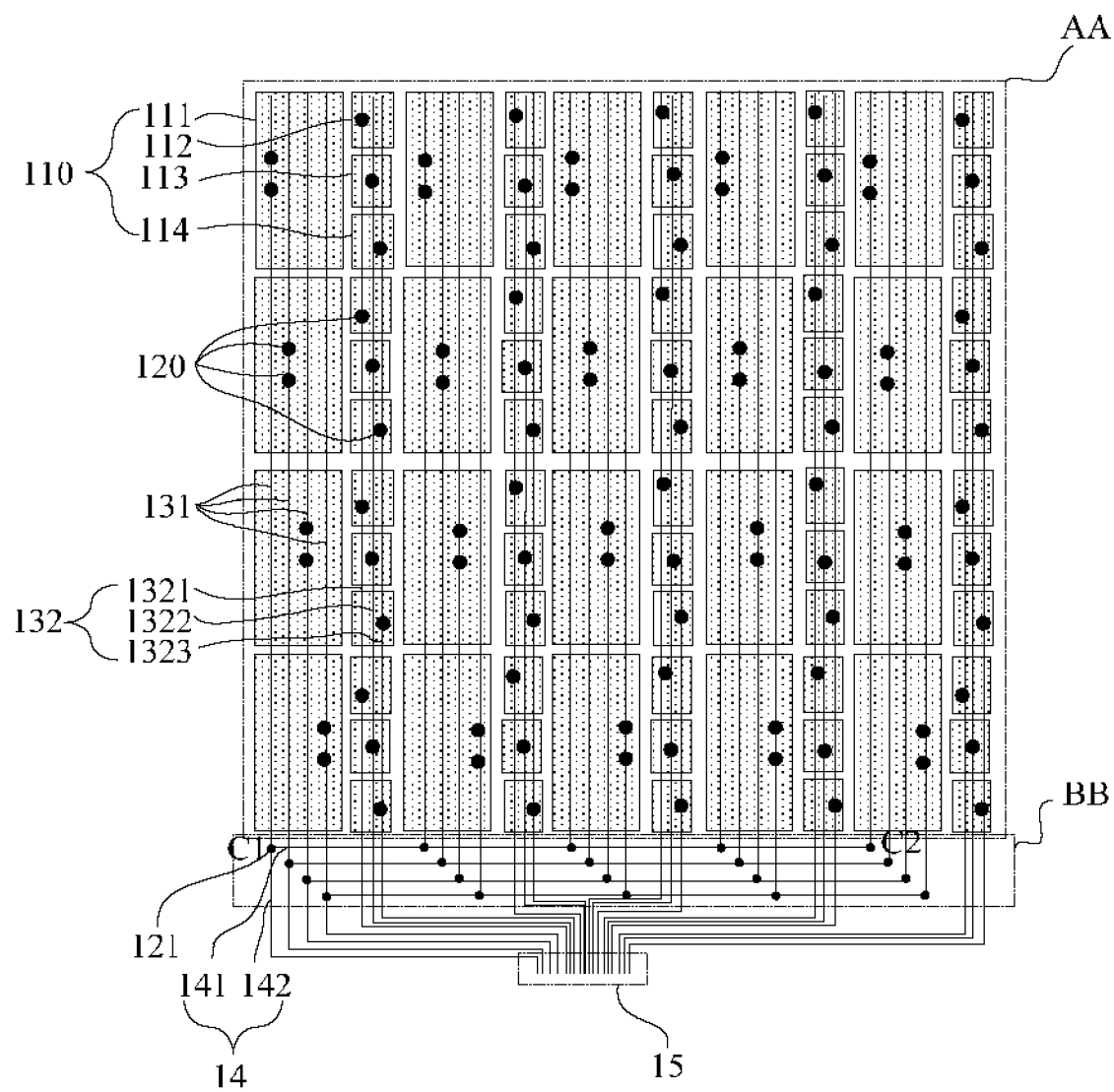
FIG. 2 is a structural schematic diagram of the array substrate in which each sensing electrode has three sub-sensing electrodes provided by an embodiment of the present disclosure.

In specific implementation, each of the sensing electrodes includes N sub-sensing electrodes which are insulated from each other. For example, as shown in FIG. 1, each of the sensing electrodes includes two sub-sensing electrodes (a first sub-sensing electrode 112 and a second sub-sensing electrode 113 respectively). Alternatively, as shown in FIG. 2, each of the sensing electrodes includes three sub-sensing electrodes (a first sub-sensing electrode 112, a second sub-sensing electrode 113, and a third sub-sensing electrode 114 respectively), and the sub-sensing electrodes are sequentially arranged along the first direction EF, where N is a positive integer. Specifically, N may be 1, 2, 3, 4, . . . ;

each of the sensing leads 132 includes N sub-sensing leads. For example, as shown in FIG. 1, each sensing lead 132 includes two sub-sensing leads (a first sub-sensing lead 1321 and a second sub-sensing lead 1322 respectively). Alternatively, as shown in FIG. 2, each sensing lead 132 includes three sub-sensing leads 132 (a first sub-sensing lead 1321, a second sub-sensing lead 1322, and a third sub-sensing lead 1323 respectively). The sub-sensing electrodes are electrically connected with the sensing lead terminals through the sub-sensing leads 132.

In specific implementation, in the sub-sensing electrodes in the same column, the sub-sensing electrodes at intervals of N−1 sub-sensing electrodes are electrically connected through one sub-sensing lead 132. Specifically, if each sensing electrode includes one sub-sensing electrode insulated from each other, the sub-sensing electrodes are directly electrically connected through one sub-sensing lead 132 without interval, the sub-sensing electrodes in one column are electrically connected through one sub-sensing lead 132; if each sensing electrode includes three sub-sensing electrodes which are insulated from each other, for example, for the structure diagram of the array substrate as shown in FIG. 2, each touch electrode 110 includes three sub-sensing electrodes, namely in the sub-sensing electrodes in the same column, the sub-sensing electrodes at the intervals of 2 sub-sensing electrodes are electrically connected through one sub-sensing lead, namely, for example, as shown in FIG. 2, in the sub-sensing electrodes in the first column from the left, the sub-sensing electrode in the first row and the sub-sensing electrode in the fourth row are electrically connected through the first sub-sensing lead 1321, the sub-sensing electrode in the second row and the sub-sensing electrode in the fifth row are electrically connected through the second sub-sensing lead 1322, and the sub-sensing electrode in the third row and the sub-sensing electrode in the sixth row are electrically connected through the third sub-sensing lead 1323.

In specific implementation, as shown in FIG. 1, each first branch 141 includes a first end part C1 and a second end part C2; and each driving connecting line 14 includes a second branch 142, and the second branch 142 is electrically connected with the first end part C1 of the corresponding first branch 141.

In an embodiment of the present disclosure, each driving connecting line 14 includes a second branch 142, and the touch detection of the array substrate may be realized through a smaller number of pins.

Figure 3:
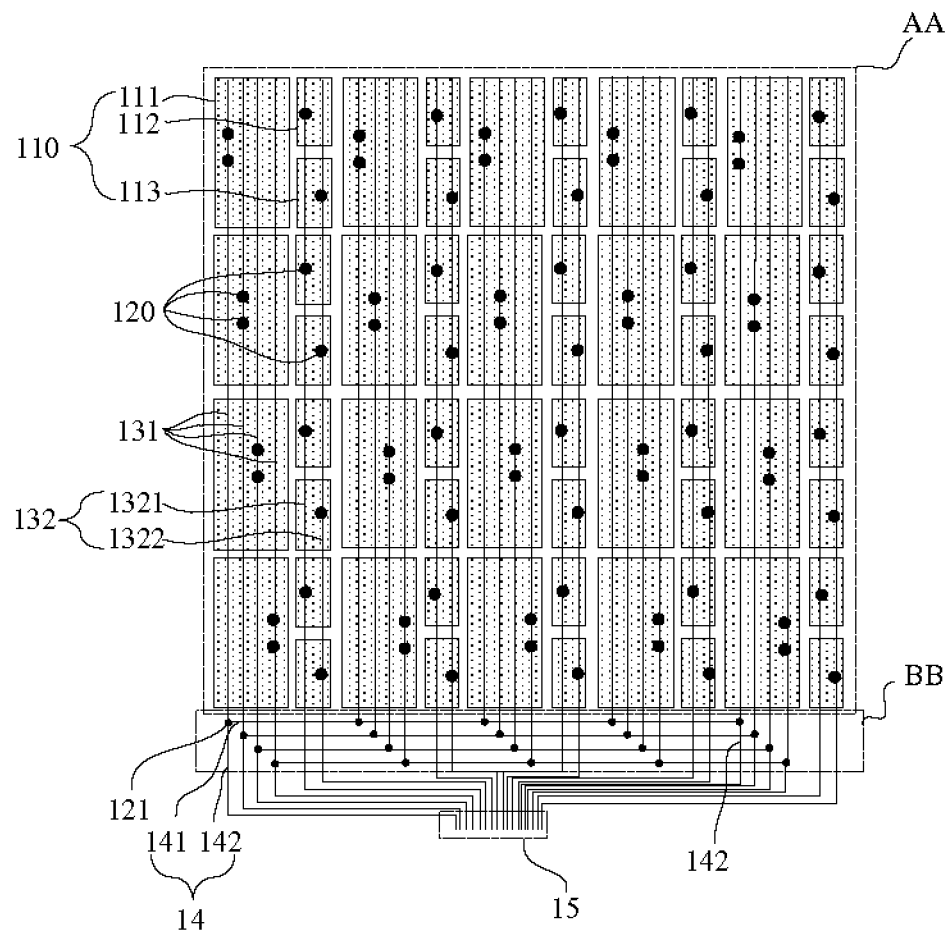
FIG. 3 is a structural schematic diagram of the array substrate in which each driving connecting line has two second branches provided by an embodiment of the present disclosure.

In specific implementation, as shown in FIG. 3, each first branch 141 includes a first end part C1 and a second end part C2; and each driving connecting line 14 includes two second branches 142, where one second branch 142 is electrically connected with the first end part C1 of the corresponding first branch 141, and the other second branch 142 is electrically connected with the second end part C2 of the corresponding first branch 141.

In an embodiment of the present disclosure, each driving connecting line 14 includes the two second branches 142, one second branch 142 is electrically connected with the first end part C1 of the corresponding first branch 141, and the other second branch 142 is electrically connected with the second end part C2 of the corresponding first branch 141. Therefore, when the touch detection is performed, touch detection signals may be input simultaneously to two ends of each first branch 141 for double-sided driving. When the size of a display product is larger and the length of each first branch 141 is relatively long, the problem of signal delay caused by resistance of the first branches 141 may be effectively improved.

In specific implementation, as shown in FIG. 1 and FIG. 2, in a direction perpendicular to the first direction EF, widths d1 of the sub-sensing electrodes are one-half of widths d2 of the driving electrodes 111. The widths d2 of the driving electrodes 111 may be designed to be 3000 um-6000 um, optionally 4,000 um, and the widths d1 of the sub-sensing electrodes (for example, the first sub-sensing electrodes 112) may be 1500 um-3000 um, optionally 2,000 um. The shapes and sizes of the sub-sensing electrodes may be set to be the same.

In specific implementation, as shown in FIG. 1 and FIG. 2, in the direction parallel to the first direction EF, lengths d3 of the sub-sensing electrodes are one-Nth of lengths d4 of the driving electrodes 111. The lengths d4 of the driving electrodes 111 may be designed to be 4000 um-7000 um, optionally 6000 um.

In specific implementation, as shown in FIG. 1 and FIG. 2, an area of one driving electrode is equal to the sum of areas of 2N sub-sensing electrodes. In an embodiment of the present disclosure, 2*N sub-sensing electrodes Rx are distributed near one driving electrode Tx and have a capacitance effect with the one driving electrode Tx. In order to ensure a touch effect, the accuracy of a touch position and the response speed of a touch action, the total area of the 2*N sub-sensing electrodes is approximately equal to the area of one driving electrode Tx, namely, generally, when the control chip IC is subjected to the touch effect debugging, the size of the driving electrode Tx is required to be equivalent to the size of the sensing electrode, namely it is a requirement for convenient debugging of the control chip IC.

In specific implementation, the vertical spacing S1 between the sub-sensing electrodes Rx is equal to S3, and the design value ranges from 5 to 10 um, optionally, is 8 um. The spacing S1 (in the vertical direction) between the driving electrodes Tx is equal to 8 um, the design value of the horizontal spacing S2 between the driving electrode Tx and the sub-sensing electrode Rx ranges from 5 to 10 um, optionally is 8 um (here, S2 may also not be equal to S1). One driving electrode Tx corresponds to two independent sub-sensing electrodes Rx, the two sub-sensing electrodes Rx and one adjacent driving electrode Tx constitute one touch electrode 110, and the touch electrodes 110 are arranged in an array to obtain a touch blocked pattern in the display area.

In specific implementation, the array substrate includes a substrate and a gate line located on one side of the substrate, as well as a data line located on one side, away from the substrate, of the gate line; and the first branches and the gate line are arranged in the same layer. In the embodiment of the present disclosure, the first branches and the gate line are arranged in the same layer, and the first branches may be formed while the gate line is fabricated, thereby simplifying the fabrication process.

In specific implementation, the array substrate includes the substrate and the gate line located on one side of the substrate, as well as the data line located on one side, away from the substrate, of the gate line; and the driving connecting lines are located on one side, away from the substrate, of the data line.

In specific implementation, the driving leads 131 and the sensing leads 132 are arranged in the same layer as the data line. In some embodiments of the present disclosure, the driving leads 131 and the sensing leads 132 are arranged in the same layer as the data line. The driving leads 131 and sensing leads 132 may be formed while the data line is fabricated, thereby simplifying the fabrication process.

In specific implementation, the touch electrodes are reused as common electrodes.

An embodiment of the present disclosure further provides a display panel including the array substrate provided by the embodiment of the present disclosure. Specifically, the display panel may be a liquid crystal display panel.

Figure 4:
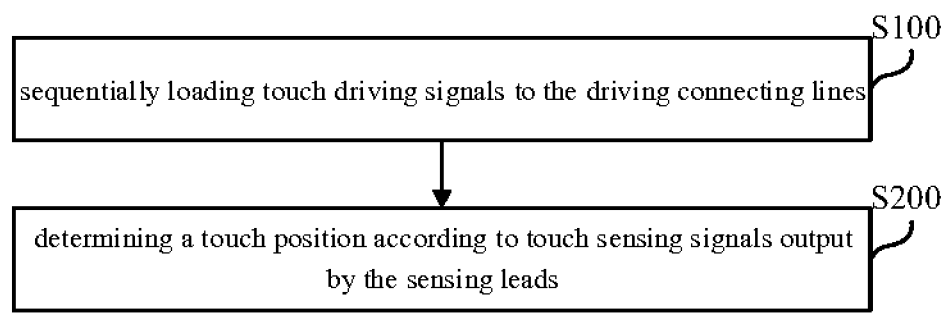
FIG. 4 is a schematic flowchart of fabricating an array substrate provided by an embodiment of the present disclosure.

As shown in FIG. 4, an embodiment of the present disclosure further provides a driving method of the array substrate provided by the embodiment of the present disclosure, including: a touch stage. In the touch stage, the driving method includes the steps of:

S100: sequentially loading touch driving signals to the driving connecting lines; and S200: determining a touch position according to touch sensing signals output by the sensing leads.

In specific implementation, each driving connecting line includes two second branches, where the step of loading touch driving signals to the driving connecting lines in the step 100 includes:

simultaneously loading the touch driving signals to two ends of the same driving connecting line through the two second branches.

In specific implementation, the driving method may also include: a display stage; and in the display stage, the driving method includes: loading display signals to the touch electrodes.

Figure 5:
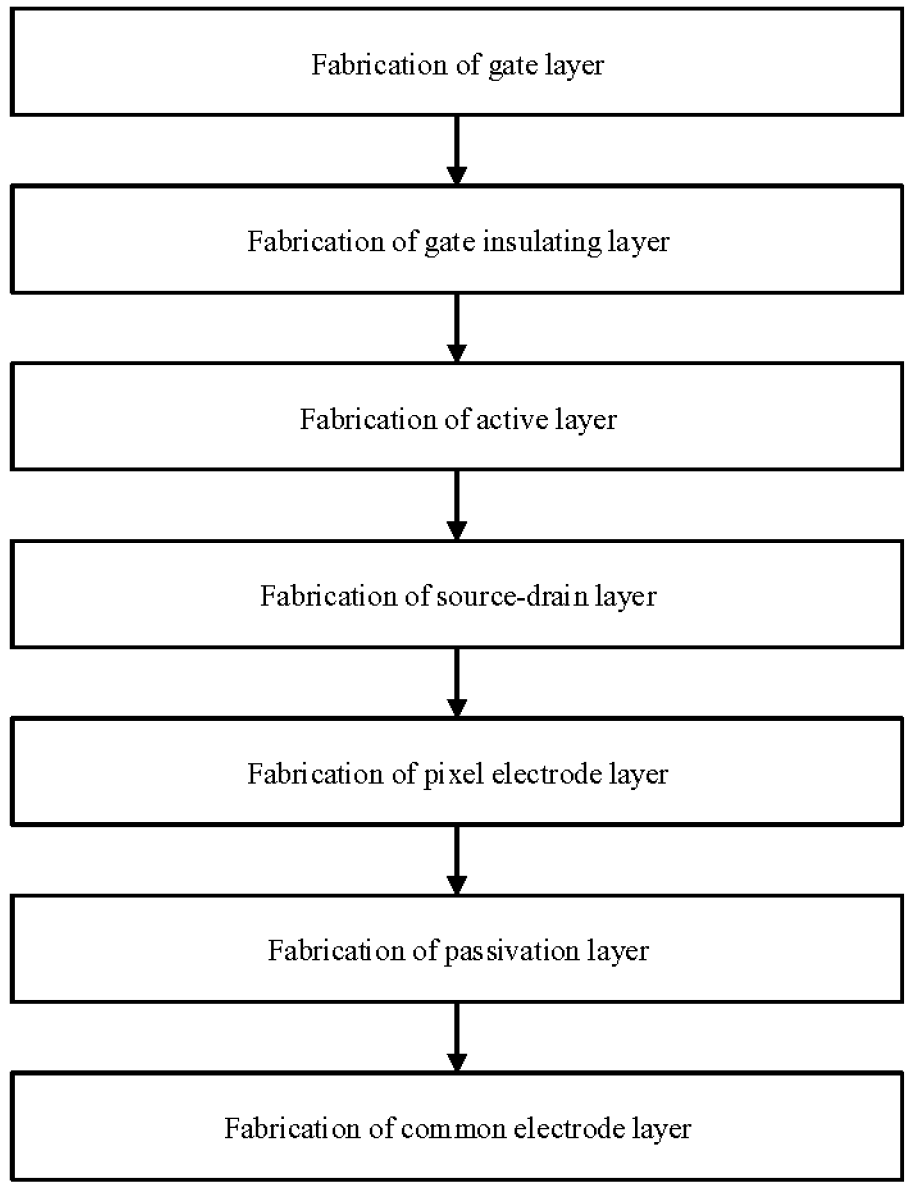
FIG. 5 is a flowchart of fabricating an array substrate by a 7-mask process provided by an embodiment of the present disclosure.

In specific implementation, specifically in an implementation mode of a process, as shown in FIG. 5, the process may be realized by using the currently commonly used 7-mask process. The implementation mode of the specific process is as follows (the specific process implementation mode of the design solution related to the present application is mainly illustrated, and other common TFT processes are not described in detail):

1. the fabrication of a pattern of a metal film layer of a gate layer: in addition to the fabrication of the pattern related to a liquid crystal display panel (LCD) (such as, the pattern of a TFT gate layer in the display area and peripheral wiring), it is required to fabricate the first branches of the driving connecting lines in the non-display area;

2. the fabrication of a pattern of a gate insulating layer: holes are punched in some positions of the gate layer for subsequent electrical connection of an SD metal layer and the gate layer; in addition to the necessary punching for the normal LCD display design, it is also required to perform punching processing on lines of the first branches of the driving connecting lines in the non-display area; and the connecting line holes 121 shown in FIG. 1 are GI via holes;

3. the fabrication of a pattern of an active layer of the TFT (this is the pattern of a film layer which is commonly used in a TFT process, which is not repeated here);

4. the fabrication of a pattern of a metal film layer of an SD layer, namely the fabrication of a source-drain layer: in addition to the fabrication of the pattern related to the LCD (such as, the pattern of the data line of the LED), it is also required to fabricate the driving leads 131 and the sensing leads 132, and the touch leads need to pass through the insides of pixels. In addition, it also should be noted that the data line from the display area, the driving leads 131 of the touch electrodes and the sensing leads 132 (such as the second branches 142) are all wired in a fanout area by using the SD metal layer. In this way, the design solution as shown in FIG. 1 may be realized, and the corresponding touch leads are electrically connected with metal lines of the gate layer in a Tx lead connecting area through the GI via holes, thereby realizing the scanning of the touch driving signals row by row; and 5. the subsequent sequential fabrication of corresponding patterns of a pixel ITO, an insulating layer PVX and Com ITO: the touch electrode holes 120 in the touch leads (the driving leads 131 and the sensing leads 132) are via holes of the insulating layer PVX, so that the electrical connection between the touch leads and the Com ITO may be realized.

Figure 6:
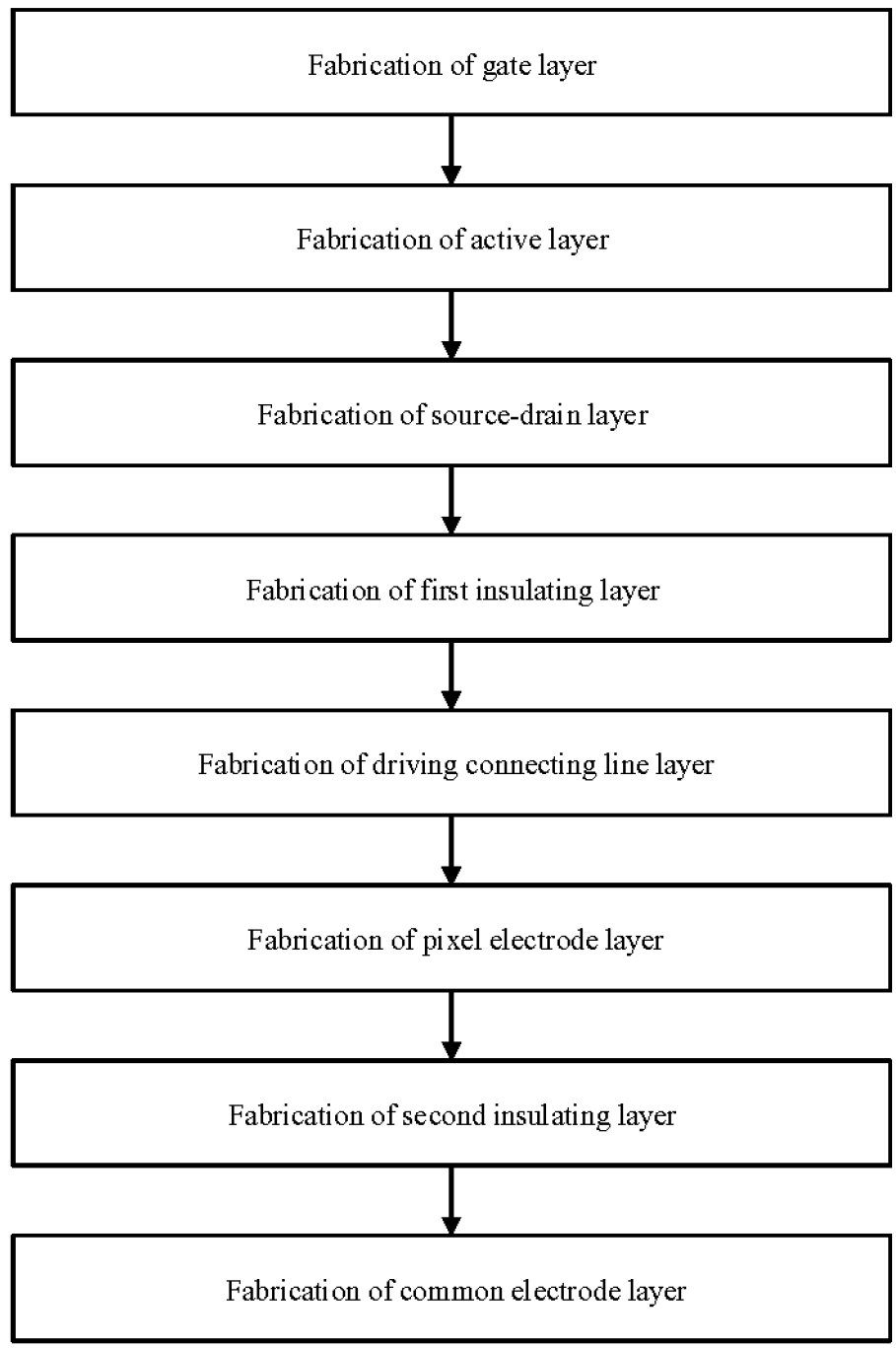
FIG. 6 is a flowchart of fabricating an array substrate by 8-mask process provided by an embodiment of the present disclosure.

The process may also be realized by using a 8-mask process, as shown in FIG. 6, and the specific implementation is as follows:

1. according to a common TFT process, patterns of a metal film layer of a gate layer, an active layer of the TFT and a metal film layer of an SD layer are fabricated sequentially (a GI pattern of a gate insulating layer on the metal of the gate layer may be fabricated at the same time, and no hole is punched in the GI layer). It should be noted that the fan-out area may use not only the single-layer gate or the SD layer for wiring, but also the gate/SD for alternate wiring. Compared to the single-layer metal wiring, the alternate wiring has the feature that the width of a frame on an outgoing line side will be narrower;

2. the fabrication of the pattern of the metal film layer of the SD layer, in addition to the fabrication of the pattern related to the LCD (such as, the pattern of the data line of the LED), it is also required to fabricate the driving leads 131 and the sensing leads 132, and the touch leads need to pass through the insides of the pixels (consistent with the design in the existing solution);

3. the fabrication of a pattern of a first insulating layer, the punching processing is performed on the driving leads 131, the sensing leads 132 and the first branches in the non-display area, namely, the punching processing of the first insulating layer is performed on the touch electrode holes 120 and the connecting line holes 121;

4. the fabrication of a pattern of a third metal layer (metal 3), namely a pattern of a driving connecting line layer, the pattern of the third metal layer is used for fabricating metal lines of the first branches 141 in the non-display area, and the driving electrodes in the same row are electrically connected;

5. the fabrication of a pattern of a pixel ITO is performed;
6. the fabrication of the pattern of a second insulating layer, it should be noted that the punching processing of the second insulating layer is performed at the touch electrode holes 120; and
7. the fabrication of the pattern of a Com ITO layer, by the punching processing of the two insulating layers at the touch electrode holes 120, the driving leads 131, the sensing leads 132 and the Com ITO may be electrically connected.

The embodiments of the present disclosure have the following beneficial effects: for the array substrate provided by the embodiment of the present disclosure, the touch electrodes includes the driving electrode and the sensing electrode; the driving leads are electrically connected with the driving electrodes in a one-to-one corresponding manner; for the plurality of sensing leads, the sensing electrodes in the same column are electrically connected with the sensing lead terminals in the non-display area through the same sensing lead; and for the plurality of driving connecting lines, the driving leads electrically connected with the driving electrodes in the same row are electrically connected with the same first branch, and the driving leads electrically connected with the driving electrodes in the different rows are electrically connected with the different first branches, namely the driving electrodes in the same row are electrically connected with the control chip through one driving connecting line, and further the number of the pins can be effectively reduced; moreover, the driving electrodes in the same row are electrically connected with one driving connecting line, further the touch driving signals are input to one row of driving electrodes through one driving connecting line, the touch driving signals are input to the various rows of driving electrodes row by row, and the touch sensing signals are output through the touch sensing electrodes, so that the mutual capacitance touch is realized and the better touch performance is provided; and in the case of the number of the pins of the control chip unchanged, the array substrate of the present application may enable the sizes of the touch electrodes to be smaller than the sizes of the touch electrodes using the self-capacitance principle (the traditional solution), thereby effectively improving touch accuracy and precision.

Obviously, those skilled in the art may make various modifications and variations to the present disclosure without departing from the spirit and scope of the present disclosure. In this way, if the modifications and variations of the present disclosure fall within the scope of the claims of the present disclosure and the equivalent technologies, the present disclosure also intends to include the modification and variations.

The invention claimed is:

1. An array substrate, comprising:
   a plurality of touch electrodes, being located in a display area and arranged in an array, and comprising driving electrodes and sensing electrodes arranged in a same layer as the driving electrodes and located on one side of the driving electrodes, and the driving electrodes and the sensing electrodes being insulated from each other;
   a plurality of driving leads, being located in the display area, extending in a first direction and being electrically connected with the driving electrodes in a one-to-one corresponding manner;
   a plurality of sensing leads, being located in the display area and extending in the first direction, and the sensing electrodes in a same column electrically connected with sensing lead terminals in a non-display area through a same sensing lead;
   a plurality of driving connecting lines, respectively comprising a first branch extending in a direction perpendicular to the first direction, and a second branch electrically connecting an end part of the first branch with a driving lead terminal in the non-display area, where the driving leads electrically connected with the driving electrodes in a same row are electrically connected with a same first branch, and the driving leads electrically connected with the driving electrodes in different rows are electrically connected with different first branches; and
   a substrate and a gate line located on one side of the substrate, and a data line located on one side, away from the substrate, of the gate line, wherein the first branch and the gate line are arranged in a same layer, or the first branch are located on one side, away from the substrate, of the data line.

2. The array substrate according to claim 1, wherein the sensing electrodes respectively comprise N sub-sensing electrodes which are insulated from each other, and the sub-sensing electrodes are sequentially arranged in the first direction, where N is a positive integer; and
   the sensing leads respectively comprise N sub-sensing leads, the sub-sensing electrodes are electrically connected with the sensing lead terminals through the sub-sensing leads.

3. The array substrate according to claim 2, wherein in the sub-sensing electrodes in a same column, the sub-sensing electrodes at intervals of N−1 sub-sensing electrodes are electrically connected through one sub-sensing lead.

4. The array substrate according to claim 2, wherein in a direction perpendicular to the first direction, a width of a sub-sensing electrode is one-half of a width of a driving electrode.

5. The array substrate according to claim 4, wherein in a direction parallel to the first direction, a length of the sensing electrode are one-Nth of a length of the driving electrode.

6. The array substrate according to claim 2, wherein an area of one driving electrode is equal to the sum of areas of 2N sub-sensing electrodes.

7. The array substrate according to claim 1, wherein the first branch comprises a first end part and a second end part; and
   the driving connecting lines respectively comprise one second branch, and the second branch is electrically connected with the first end part of a corresponding first branch.

8. The array substrate according to claim 1, wherein the first branch comprises a first end part and a second end part; and
   the driving connecting lines respectively comprise two second branches, where one of the second branches is electrically connected with a first end part of a corresponding first branch, and other second branch is electrically connected with a second end part of the corresponding first branch.

9. The array substrate according to claim 1, wherein the driving leads and the sensing leads are arranged in a same layer as the data line.

10. The array substrate according to claim 1, wherein the touch electrodes are reused as common electrodes.

11. A display panel, comprising the array substrate according to claim 1.

12. The display panel according to claim 11, wherein the sensing electrodes respectively comprise N sub-sensing electrodes which are insulated from each other, and the sub-sensing electrodes are sequentially arranged in the first direction, where N is a positive integer; and
the sensing leads respectively comprise N sub-sensing leads, the sub-sensing electrodes are electrically connected with the sensing lead terminals through the sub-sensing leads.

13. The display panel according to claim 12, wherein in the sub-sensing electrodes in a same column, the sub-sensing electrodes at intervals of N−1 sub-sensing electrodes are electrically connected through one sub-sensing lead.

14. The display panel according to claim 12, wherein in a direction perpendicular to the first direction, a width of a sub-sensing electrode is one-half of a width of a driving electrode.

15. The array substrate according to claim 11, wherein the first branch comprises a first end part and a second end part; and
the driving connecting lines respectively comprise one second branch, and the second branch is electrically connected with the first end part of a corresponding first branch.

16. The display panel according to claim 11, wherein the first branch respectively comprise a first end part and a second end part; and
the driving connecting lines comprises two second branches, where one of the second branches is electrically connected with a first end part of a corresponding first branch, and other second branch is electrically connected with a second end part of the corresponding first branch.

17. A driving method of the array substrate according to claim 1, comprising: a touch stage, wherein in the touch stage, the driving method comprises steps of:
sequentially loading touch driving signals to the driving connecting lines; and
determining a touch position according to touch sensing signals output by the sensing leads.

18. The driving method according to claim 17, wherein the driving connecting lines respectively comprises two second branches; and
the step of loading touch driving signals to the driving connecting lines comprises: simultaneously loading the touch driving signals to two ends of a same driving connecting line through the two second branches.

* * * * *